US012761054B1

(12) United States Patent
Calvi

(10) Patent No.: US 12,761,054 B1
(45) Date of Patent: Oct. 13, 2026

(54) FLOW-MEASURING DEVICE FOR THE PURPOSE OF DIAGNOSING THE CAUSE OF RISING WATER PRESSURE IN A CLOSED WATER SYSTEM

(71) Applicant: David L Calvi, Lake Havasu City, AZ (US)

(72) Inventor: David L Calvi, Lake Havasu City, AZ (US)

( * ) Notice: Subject to any disclaimer, the term of this patent is extended or adjusted under 35 U.S.C. 154(b) by 0 days.

(21) Appl. No.: 19/539,100

(22) Filed: Feb. 13, 2026

(51) Int. Cl.
*G01F 1/684* (2006.01)
*G01F 1/36* (2006.01)
*G01F 1/40* (2006.01)
*G01F 1/66* (2022.01)

(52) U.S. Cl.
CPC .............. *G01F 1/684* (2013.01); *G01F 1/363* (2013.01); *G01F 1/40* (2013.01); *G01F 1/662* (2013.01)

(58) Field of Classification Search
CPC ................................. G01F 1/684; G01F 1/363
See application file for complete search history.

(56) References Cited

U.S. PATENT DOCUMENTS 2,886,058 A 5/1959 Horton
3,160,317 A 12/1964 Hambro
6,915,813 B2 7/2005 Kobes
12,352,018 B1 7/2025 Calvi
2009/0056130 A1* 3/2009 Ross ........................ G01F 15/00 29/890.09
2013/0167952 A1 7/2013 Mattson et al.
2016/0128608 A1* 5/2016 Buess .................... A61B 5/087 600/538
2025/0354845 A1* 11/2025 Konishi .................. G01F 1/662

FOREIGN PATENT DOCUMENTS

GB 2312511 A * 10/1997 ........... G01F 1/7088

* cited by examiner

*Primary Examiner* — Stephanie E Bloss
*Assistant Examiner* — Diana Hancock
(74) *Attorney, Agent, or Firm* — Plager Schack LLP; Mark H. Plager; Robert Kelley Roth

(57) ABSTRACT

A flow-measuring device comprises a housing having a top and a bottom and defining a central opening, an entry at the top of the housing, and a central chamber, wherein the central chamber is connected to the entry by the central opening, a circumferential lip extending from the central chamber where the central opening meets the central chamber, wherein the circumferential lip collects droplets of the fluid at a rate proportional to the flow rate of the fluid, an exit in fluid communication with the central chamber, and a pair of metal elements each mounted in the exit, separated by a hoop distance and operatively connected to a sensor. Both metal elements receive and are in contact with the droplet when the droplet falls from the circumferential lip for a contact time, and the sensor is adapted to sense when the droplet is in contact with both metal elements.

5 Claims, 4 Drawing Sheets

FLOW-MEASURING DEVICE FOR THE PURPOSE OF DIAGNOSING THE CAUSE OF RISING WATER PRESSURE IN A CLOSED WATER SYSTEM

BACKGROUND OF THE INVENTION

Flow-measuring devices measure flow of a liquid such as water as a volume over time. It would be desirable to provide a device for accurately measuring the flow of a liquid at a low flow rate in order to diagnose the cause of rising water pressure in a closed water system.

SUMMARY OF THE INVENTION

In accordance with a first aspect, a flow-measuring device for measuring a low rate of flow of a liquid comprises a housing having a top and a bottom and defining a central opening, an entry at the top of the housing, and a central chamber, wherein the central chamber is connected to the entry by the central opening, a circumferential lip extending from the central chamber where the central opening meets the central chamber, wherein the circumferential lip is adapted to collect droplets of the fluid at a rate proportional to the flow rate of the fluid, an exit in fluid communication with the central chamber, and a pair of metal elements each mounted in the exit, wherein the pair of metal hoop elements are separated by a hoop distance and operatively connected to a sensor. Both metal elements are adapted to receive and be in contact with the droplet when the droplet falls from the circumferential lip for a contact time, and the sensor is adapted to sense when the droplet is in contact with both metal elements. The flow-measuring device measures flow rate and a number of events which can be compared with reference data to generate signals corresponding to the reference data.

DETAILED DESCRIPTION OF CERTAIN EMBODIMENTS

In the following detailed description of the invention, numerous details, examples, and embodiments of the invention are described. However, it will be clear to those skilled in the art that the invention disclosed herein is not limited to the embodiments set forth and that the invention can be adapted for any of several applications. This list of possible constituent elements is intended to be exemplary only, and it is not intended that this list be used to limit the present application to just these elements. Persons having ordinary skill in the art given the present disclosure may understand there to be equivalent elements that may be substituted within the present disclosure without changing the essential function or operation of the device. The various elements of the device of the present disclosure may be related in the following exemplary fashion. It is not intended to limit the scope or nature of the relationships between the various elements and the following examples are presented as illustrative examples only.

Figure 1:
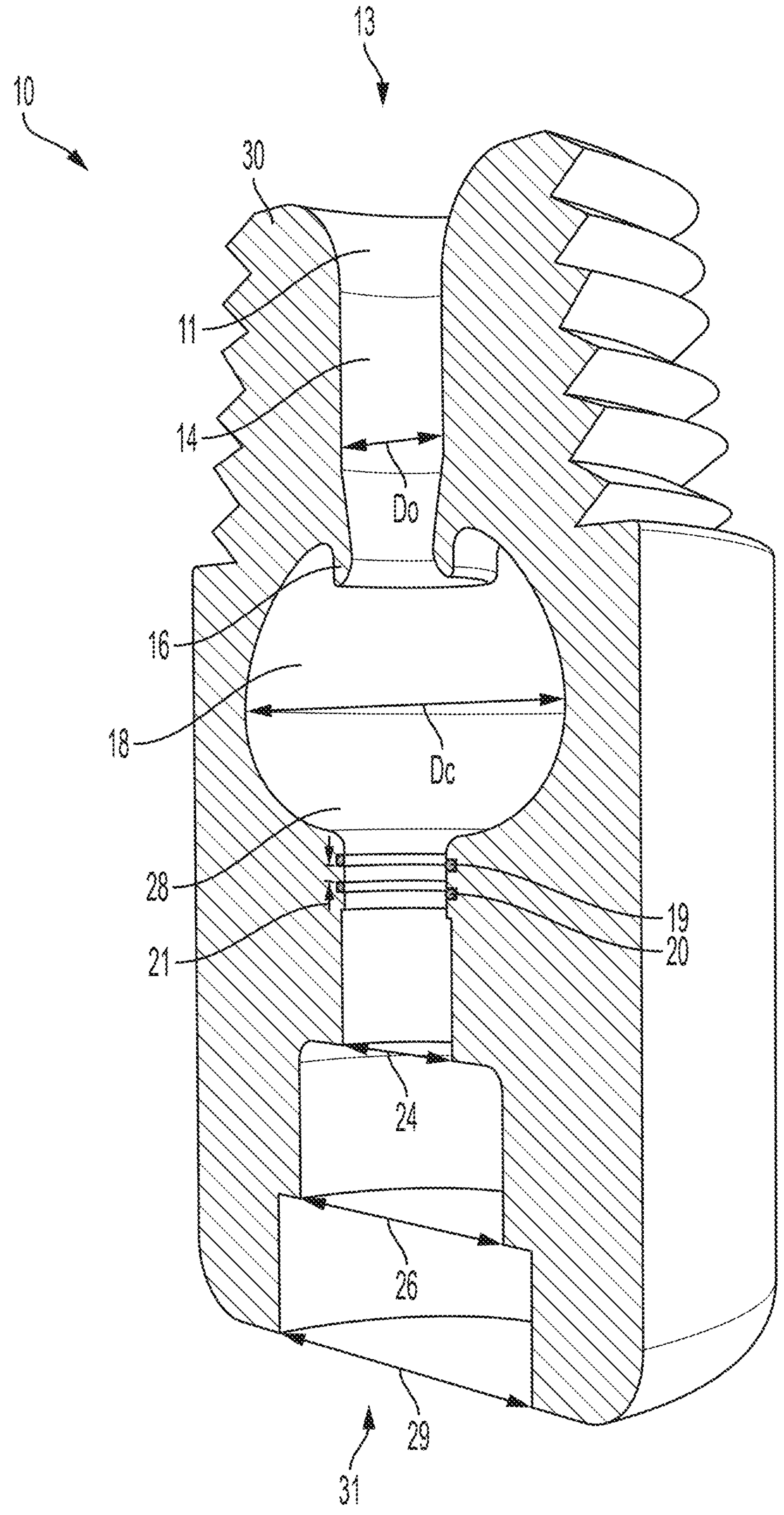
FIG. 1 is a schematic cross section view of a housing of a flow-measuring device in accordance with one embodiment.

Turning now to the drawings, FIG. 1 shows a cross-section view through part of a flow-measuring device 10 for measuring a fluid in accordance with one embodiment where a housing 30 has a top and a bottom and defines a central opening 13. An entrance 14, preferably with an entry 11 which is funnel shaped as shown at the top of the central opening allows for fluid, typically water, to enter the central opening 13. A flow restrictor may be positioned above the entry 11. The central opening 13 is connected to a central chamber 18. A circumferential lip 16 extends into the central chamber 18 where the central opening 13 meets the central chamber. The fluid, flowing at a relatively low flow rate enters the entrance 14 Drops of the fluid form on the circumferential lip 16 at a rate proportional to the flow rate of the fluid. Central opening 13 has a first diameter which narrows from the funnel to the circumferential lip. The central chamber 18 has a largest/maximum chamber diameter Dc which exceeds the first diameter Do of the central opening 13. The housing 30 may be provided with exterior threading to connect the flow-measuring device 10 to a source of the flowing fluid.

The flow-measuring devices 10 disclosed herein may be operatively connected to fluid received from a pressure relief valve at entrance 14, such as the pressure relief devices disclosed in U.S. Pat. No. 12,352,018 B1 to Calvi, the disclosure of which is incorporated by reference herein. The pressure relief valve releases a small flow of water from an otherwise-closed plumbing system, so that the water pressure remains below a predetermined limit pressure, for example, 75 PSI (where normal pressure is, for example, 55 PSI) reducing the chance of a house flood. The pressure relief valve acts as a flow restrictor to reduce or prevent over-releasing of water due to high flow during initial opening. The flow-measuring devices disclosed herein can measure the flow rate of the fluid corresponding to a generally slowly rising pressure released by a faulty upstream water pressure relief valve, and serve as a warning before undesirably high fluid pressure causes damages or breaks along a fluid path.

In operation, droplets of fluid form sequentially in response to gravity and collect on the circumferential lip 16 (held temporarily by surface tension) and eventually fall through the bottom 28 of the central chamber 18 and then past a pair of circumferential metal elements or hoops 19 and 20 separated by a hoop distance (e.g. just shorter than a droplet length) 21. The size of each drop is essentially the same. The hoop distance 21 is approximately equivalent to a length of each droplet, so that as the droplets fall, each droplet is, for a contact time, briefly in contact with both metal elements 19, 20 at the same time. The metal elements are operatively connected to a sensor (not shown). The metal elements/loops 19, 20 can be connected to an electronic data sender by one wire per ring (not shown). Each droplet and the metal elements 19, 20 effectively form a closed circuit during the brief contact time when the droplet is in contact with both metal elements, that is, the sensor is adapted to sense when the droplet is in contact with both metal elements. Further, this momentarily closed circuit can be used by the sensor to count a time between droplets, and given that each droplet has the same volume of fluid, a flow rate of the droplets can be calculated. The sensor can be connected to another device (for example, the electronic data sender, or EDS) which sends data, such as flow rate (or time between drops), to a server. The flow rate can give information about the rising pressure of the fluid, and can be compared with known causes of rising pressure to diagnose a cause of rising pressure. For example, the flow rate of the released water from a connected upstream pressure relief valve to the flow-measuring device can vary with the amount of calcium-ion buildup in the even-more-upstream pressure regulator at the beginning of the home's water system (the older the unit, the more calcium buildup, the faster the bleed-through).

The water droplets, once past the metal elements 19, 20, can either fall through an exit 31 to the ground (as in the case where the flow-measuring device is attached to the outlet of a Pressure Guard which is connected to an outside hose bib), or the fluid can flow into a drain via a tube pushed into an aftermarket cartridge that fits into the outlet diameter of the flow-measuring device, with an O-ring. Either way, the droplets are removed to avoid pooling at the metal elements/hoops. Optionally the exit 31 may be provided with a series of stages, with each stage having a different width. In the embodiment of FIG. 1, the exit has a first segment with first width 24 generally adjacent the bottom 28 of the central chamber 16 for the inserting of a ¼" tube, for example, a second segment positioned below the first segments with second width 26, and a third segment positioned below the second segment with a third width 29, where the second width 26 is greater than the first width 24 for an O-ring, and the third width 29 is greater than the second width 26 to receive an aftermarket cartridge and collet that holds in the O-ring, and tube, for example. The first width 24 may be slightly larger than a hoop width of the central opening 13 at the metal elements 19, 20 so no pooling occurs at 19 20 if a ¼" tube is inserted, as noted above.

Figure 2:
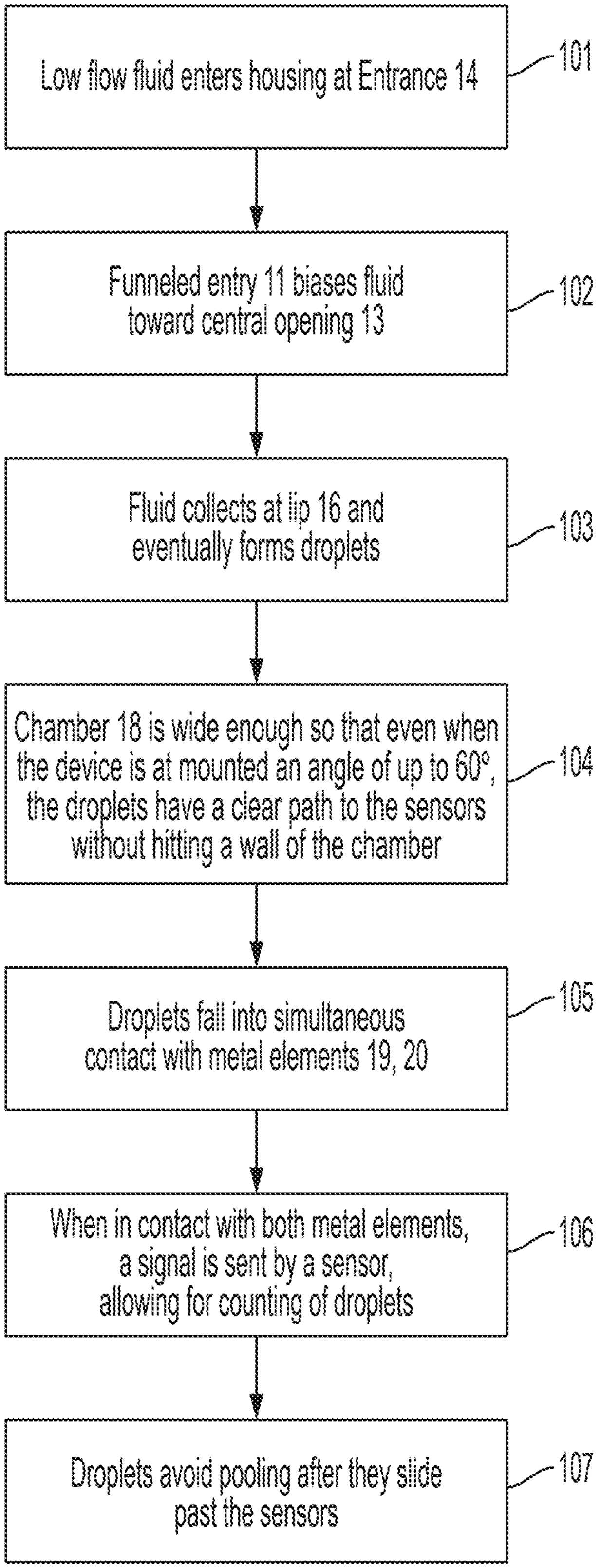
FIG. 2 is a flow chart representative of the operation of the flow-measuring device of FIG. 1.

FIG. 2 is a flow chart describing operation of the flow-measuring device. At step 101, a fluid with a relatively low flow rate, such as fluid from a pressure relief valve with a flow-rate restrictor, flows into the flow-measuring device 10 through entrance 14. At step 102, the fluid is guided toward the central opening 13 by funneled entry 11. At step 103, the fluid falls through the central opening (optionally with the central opening having a reduced diameter) to the circumferential lip 16. The fluid collects at the lip as droplets, due to surface tension. The mass of each droplet grows until gravity causes each droplet to exceed its surface tension, and fall. Note that the mass of each droplet is essentially equal, due to the consistency of surface tension, and of gravity. This process creates a pattern where droplets fall at a precise rate, based on the volume of water released by the attached relief valve. Preferably, the chamber 18 is wide enough so that even when the device is mounted at an angle of up to as much as 60°, the droplets have a clear path, gravitationally, to the sensors 19, 20 without immediately hitting a wall, until the droplet has already fallen naturally from the circumferential lip. Step 104. At step 105 the droplet falls through the central chamber 18. To reiterate, the central chamber is wide enough so that the water droplet that is developing on the lip 16 will not touch the side of the chamber. This is so that the droplet is not touched by the wall prematurely, which could affect when it falls by negating its surface tension before it grows to an equal mass as the expected droplet size, Optionally, the flow-measuring device may be mounted at an acute angle with respect to vertical. At step 106, the droplet falls and hits a bottom of the central chamber 18 and slides past the two metal hoops 19, 20 positioned vertically with respect to one other, but laying horizontally, spaced apart at a distance about a minimum average length of a water droplet, so that each droplet hits both hoops simultaneously for a short period of time, allowing for the sensing of each drop. When the droplet contacts both metal elements 19, 20, a circuit is closed. An electronic signal "trigger" is sent to a sender unit via two wires, one connected to each element 19, 20. The sensor, operatively connected to the metal elements, can sense how many droplets pass per unit of time (or the exact time between two droplets falling), and since the droplets are essentially equal in volume, the flow rate of the fluid may be calculated. The fluid falls past the sensors (so that there is no pooling), directly out the unit, to the ground if the device is outside at a hose bib, or to an optional attached ¼" hose, down to a drain if indoors. Step 107. The lack of pooling advantageously allows for the counting of individual released droplets, and in turn allows for the detection of potentially problematic rising pressure and the diagnosis of why that rising pressure is occurring.

Figure 3:
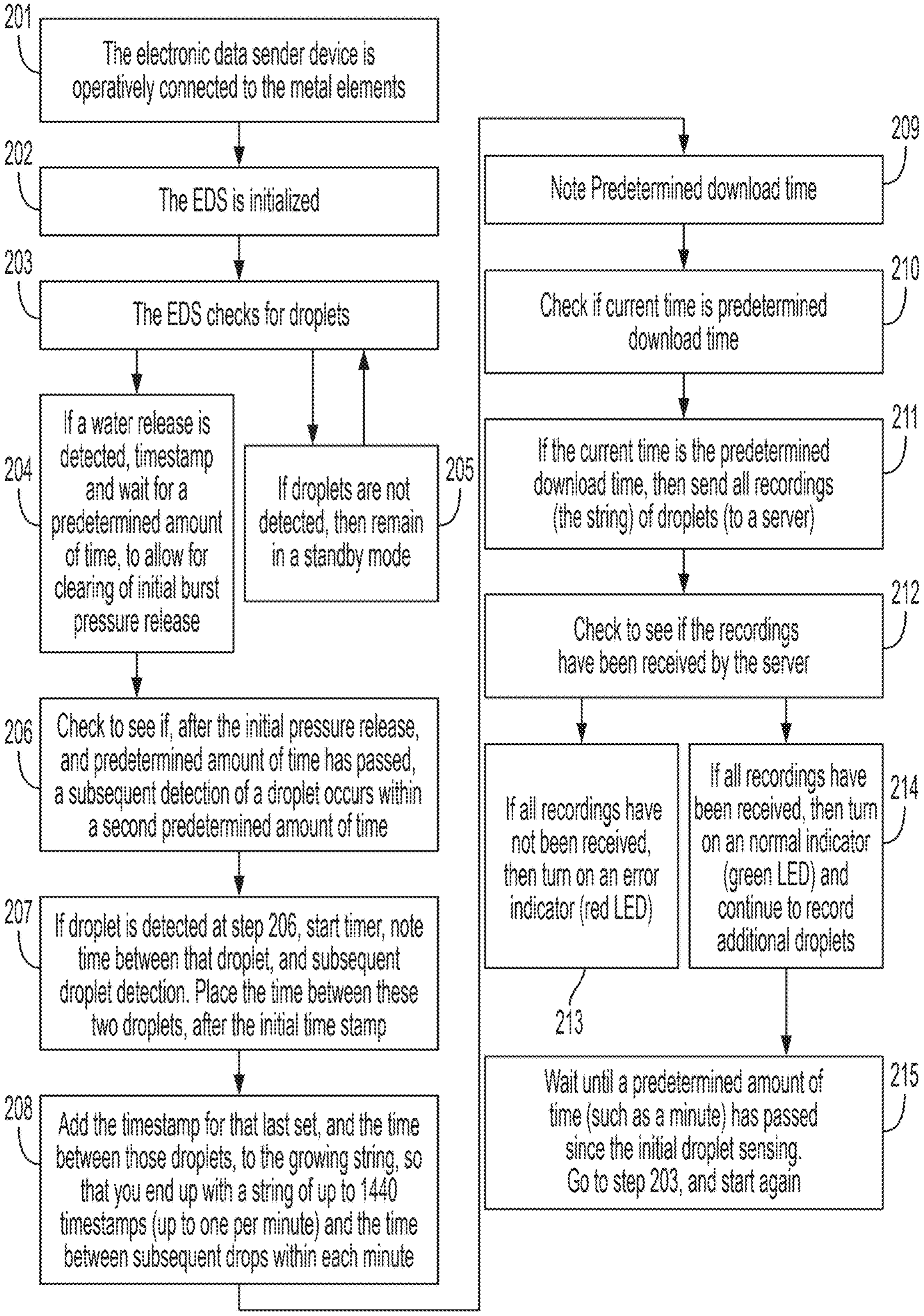
FIG. 3 is a flow chart representative of data collection of the flow-measuring device of FIG. 1.

FIG. 3 is a schematic flow chart representative of data collection using the flow-measuring device of FIG. 1 in accordance with one embodiment. Of note, there can be a burst pressure initially, and the flow-measuring device advantageously takes this into account to avoid erroneous measurements.

At step 201, the EDS, which can be provided with a distinct electronic serial number and an internal clock (accurate to $100^{th}$ of a second, for example), is operatively connected to the flow-measuring device via two wires: one to each sensor hoop 19, 20. At step 202, the initial installation is performed. Set up-wires from the flow-measuring device are connected, the electronic sender is plugged in, and/or batteries are installed, the sender unit is connected to the server via end-user's router via WiFi, through a smartphone app. The server can create a file with the EDS serial number, date, time, power level, and salesman number, for example. At this point the EDS begins checking for droplet triggers, that is, indications that the droplets have contacted both metal elements 19, 20 simultaneously. At step 203, the device checks to see if a droplet trigger has occurred. If yes for the first time for that recording period, then at step 204, the sensor can send a signal indicating that the droplet trigger has occurred and the EDS can create a string of characters that begins with the timestamp of the first trigger, optionally presented in a format of "hh:mm:ss.ss". Next, the device is programmed to wait a predetermined period of time, such as, for example, fifteen seconds, aka a waiting period, to avoid measuring initial burst pressure. If no droplet trigger has been detected at step 203, then at step 205, the device stays in a low-power-use/standby mode awaiting a trigger.

At step 206, the device checks to see if a subsequent droplet trigger has occurred after the predetermined "burst pressure release" period of time has passed. If the answer is yes, then at step 207 the time of this subsequent droplet detection is recorded and compared with the time of the next droplet trigger. This measurement is the flow rate, or the amount of time between two consecutive droplets. The flow rate may vary throughout the day, and generally speaking there will typically only be one, two or three distinct flow rates of rising pressure, measured up to once per minute, with periods of time of no high-pressure flow releases. This is because the pressure rises that occur, bringing the water pressure from its normal 55 psi to the pressure relief valve's open-point of around 75 psi, takes time. When someone in the home releases the rising water pressure, by using a faucet for instance, the water pressure will go back down to 55 psi, requiring more time to for the rising bleed-through pressure of the upstream pressure regulator, for example, to slowly rise back up to the 75 psi release point, where we can again measure the time between drops. These trigger events, and the time between them, may also be recorded and compared with reference standards for different causes of water pressure rises that might need attention. There can be a continuous event (for several minutes or hours) or a series of events (i.e., a series of droplet triggers, the time between two drops measured as often as once per minute, followed by a pause, and then another series of droplet triggers a few minutes or hours later), and each event occurs when the droplet trigger starts and stops over a unit of time. Comparison with reference standards for producing status messages is described in greater detail below.

At step 208, the device checks to see if additional droplet trigger/detections are made at each minute increment if one continuous event. If so, then add the time and the frequency for that release, to a growing string of measurements, ending with a string of up to 1440 minutes per day (60 min×24 hours/day). In addition to recording these measurements of droplet triggers per unit of time, as well as a number of events (continuous drops measured each minute, with a longer period of no droplets between the continuous-minute-measured drops of an event), the device may also provide a daily update. For example, at step 209 a predetermined download time is selected and compared with the current time to see if the current time is the predetermined download time (for example, is it 8 AM?). Step 210. If the answer is yes, then at step 211 send the string with all the recordings of droplet triggers (to a server). The recordings can also comprise, for example, a packet containing: the EDS serial number, an AC (or DC power level), all timestamps, and recorded time between two droplets for each timestamp, in the string (in timestamp order from 08:00 yesterday, to 07:59.59.99 today), so up to 1440 timestamps, or up to one per minute, in the single string. At step 212, the device checks to confirm that the server received the recordings. If all recordings have not been received by the server, then at step 213, turn on an error indicator (such as a red LED). If all recordings have been received, then at step 214 turn on a normal indicator (green LED) and continue to record additional droplets. Finally at step 215, Wait until the predetermined period of time has passed since the initial droplet sensing. Go to step 203, and start again.

Figure 4:
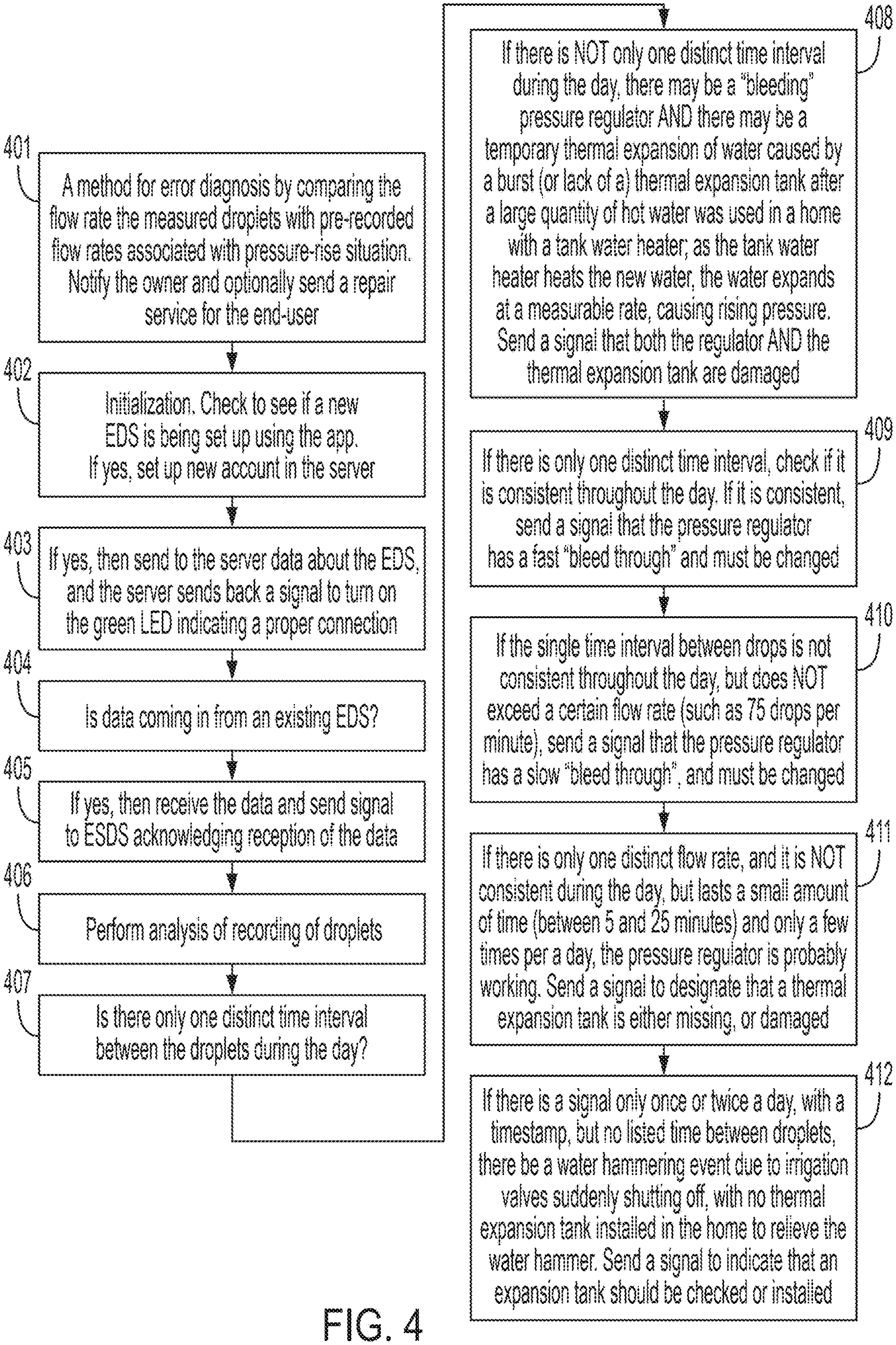
FIG. 4 is a flow chart representative of data interpretation of the flow-measuring device of FIG. 1.

FIG. 4 is a schematic flow chart of a method for error analysis and diagnosis performed by the device and an early warning system to help protect the owner of the water source when the flow-measuring device indicates that pressure is rising. At step 401, the device disclosed herein can compare the flow rate of the measured droplets, as well as start-and-stop patterns (events) with pre-recorded flow rates associated with pressure-rise situation which serve as a reference standard. This is particularly useful of indication that an upstream water pressure regulator and/or a thermal expansion tank are in need of service or replacement. The upstream pressure regulator is operatively connected to a same water line as the flow-measuring device and restricts water pressure into a house. For example, incoming pressure from a city water supply may be 120 PSI, and the regulator, when operating properly, is supposed to restrict the water pressure into the house to 55 PSI, by shutting off the supply from the city when it senses 55 PSI has been reached in the home's pipes. The thermal expansion tank is also operatively connected to the same water line as the flow-measuring device, and is an important safety device for tank-style water heaters, designed to prevent dangerous pressure buildup (greater than 75 PSI or 80 PSI, for example) in closed-loop plumbing systems by providing space for water to expand when heated. In accordance with a highly advantageous element, data about flow rates and events from the flow-measuring device can be used to diagnose the status of the pressure regulator and/or the thermal expansion tank (if present), and to optionally notify the end-user/owner and/or optionally alert a repair crew. The analysis and notification disclosed herein advantageously allows for repair before the owner has high water pressure long enough for the weakest part of the system to fail, thereby preventing a house flood, before the homeowner even realizes he has a problem. At step 402, as an initial matter, the device checks to see if a new EDS is being set up. This can be done using an app on a phone. If yes, then at step 403 send to the server data about the EDS, and the server sends back a signal to turn on the green LED indicating a proper connection. The data can comprise, for example, the EDS serial number, a sales ID, a location address, a text number, an email address, and customer names, or fewer points of data if privacy is requested.

At step 404, the server asks if a new daily data packet is coming in from an ESD. If yes, then at step 405 receive the string (including data about flow rates and events) and send back a signal acknowledging reception. At step 406, perform an analysis of the data about the flow rate of the droplets and events. This comprises an analysis of the time intervals between the droplet triggers over the course of the day, and the number of times droplet triggers occur. At step 407, the method checks to see if there is only one distinct time interval between droplets during the day (i.e., one distinct time between the two droplets in each minute that is returned. One "speed" of the drops, no matter how many minutes it continues, or has hours or minutes between each event). Even if there is only one event, the device can send a signal indicating that there has been an increase in pressure. Flow rates (time between droplets) can be slow (e.g., one drop per 15 seconds), or fairly fast (three drops per second), and the events (times wherein a consistent sensing of drops in each minute, without a break) can happen just once a day, or happen throughout the day, depending on if the cause is the pressure regulator going bad, or the thermal expansion tank having a burst bladder (or if the home does not even have a thermal expansion tank installed). That is, if there is NOT one distinct time interval during the day, but many different "speeds" throughout the day, then there may be a "bleeding" pressure regulator and a damaged thermal expansion tank. That is, there may be a temporary thermal expansion of water caused by a burst (or a lack of a) thermal expansion tank after a large quantity of hot water was used in the home with a tank water heater; as the tank water heater heats the new water, the water expands at a consistent and measurable rate, causing rising pressure. In this case a signal is sent that both the regulator AND the thermal expansion tank are damaged. Step 408. If there is only one distinct time interval, the device checks to determine if the flow rate is consistent throughout the day. If it is consistent, send a signal that the pressure regulator has a fast "bleed through" and must be changed. Step 409. The measured data may be compared with reference data corresponding to status where a signal needs to be sent (i.e., where there is a probable problem with the regulator or the thermal expansion tank). When the measured data matches with one of the reference data indicating a problem, the signal is sent corresponding to the matched reference data.

If the single-time interval between drops is not consistent throughout the day, but does not exceed a certain flow rate (for example, 75 drops per minute), then send a signal that the pressure regulator has a slow "bleed through", and must be changed. Step 410. Again, the data measured by the flow-measuring device may be compared to reference data corresponding to the problem status, here a slow bleed through, and if there is a match, then the device sends a signal indicating slow bleed through status.

If there is only one distinct flow rate, and it is not consistent during the day, but lasts a limited amount of time (for example between 5 and 25 minutes) and only a few times per a day (for example 3× per day, for 10 minutes each), then the expansion tank is probably not working; the reason for this is: when there is no working thermal expansion tank in a plumbing system that uses a tank-style water heater, every time the water heater heats the water, as in after a shower for instance, the pressure will go up by about 1.3 PSI to 2 PSI per minute, depending on the heat put out by the water heater (electric water heaters are slower-rising, for a longer period of time, and gas water heaters are faster-rising for a shorter period of time). They will raise the water pressure from 55 PSI to the relief valve break point at 75 PSI, then keep expanding the water to cause the droplets to be measured until the heater turns off, when the water in the water heater is back up to the temperature required by the setting on the heater. The drops then stop, as the pressure stops rising. So then, the event ends. The measured data can be compared to reference data corresponding to when the thermal expansion tank is either missing, or damaged, and if so, the device sends a signal indicating this status.

If there is a signal only once or twice a day, with a timestamp, but no listed time between droplet triggering events, then there may be a water hammering event due to irrigation valves suddenly shutting off, with no thermal expansion tank installed in the home to relieve the water hammer. In this case after comparison and matching of the measured data with predetermined data corresponding to the water hammering event, a signal is sent to indicate that the water hammering event has occurred and the water expansion tank should be checked, or installed if currently missing.

Persons of ordinary skill in the art, given the benefit of this disclosure, may appreciate that numerous design configurations may be possible to enjoy the functional benefits of the inventive systems disclosed herein. Thus, given the wide variety of configurations and arrangements of embodiments of the present invention the scope of the invention is reflected by the breadth of the claims below rather than narrowed by the embodiments described above.

What is claimed is:

1. A flow-measuring device for measuring a rate of flow of a liquid comprising, in combination:

a housing having a top and a bottom and defining a central opening, an entry at the top of the housing, and a central chamber, wherein the central chamber is connected to the entry by the central opening;

a circumferential lip extending from the central chamber where the central opening meets the central chamber, wherein the circumferential lip is adapted to collect droplets of the fluid at a rate proportional to the flow rate of the fluid;

an exit in fluid communication with the central chamber;

a pair of metal elements each mounted in the exit, wherein the pair of metal elements are separated by a hoop distance and operatively connected to a sensor; and both metal elements are adapted to receive and be in contact with the droplet when the droplet falls from the circumferential lip for a contact time, and the sensor is adapted to sense when the droplet is in contact with both metal elements.

2. The flow-measuring device of claim 1 wherein the central chamber has a maximum diameter which exceeds a first diameter of the central opening.

3. The flow-measuring device of claim 1 wherein the entry is funnel shaped.

4. The flow-measuring device of claim 1 wherein the exit has a first segment with a first width adjacent the central chamber, and a second segment having second width positioned below the first width, wherein the second width is greater than the first width.

5. The flow-measuring device of claim 4 wherein the exit has a third segment positioned below the second segment and having a third width, wherein the third width is greater than the second width.

* * * * *